US012741689B1

(12) United States Patent
Thompson et al.

(10) Patent No.: US 12,741,689 B1
(45) Date of Patent: Sep. 22, 2026

(54) RECONFIGURABLE STEERING DEVICE

(71) Applicant: DEERE & COMPANY, Moline, IL (US)

(72) Inventors: Michael W. Thompson, Clayton, IN (US); Brian M. Huenink, Cedar Grove, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/207,944

(22) Filed: May 14, 2025

(51) Int. Cl.
*B62D 1/22* (2006.01)
*B62D 1/04* (2006.01)
*B62D 1/12* (2006.01)

(52) U.S. Cl.
CPC ................ *B62D 1/22* (2013.01); *B62D 1/04* (2013.01); *B62D 1/12* (2013.01)

(58) Field of Classification Search
CPC ........ E02F 9/2004; E02F 9/2087; B62D 1/04; B62D 1/043; B62D 1/12; B62D 1/22
See application file for complete search history.

(56) References Cited

U.S. PATENT DOCUMENTS 4,478,308 A * 10/1984 Klaassen ............... E02F 9/2004 180/326
5,562,119 A * 10/1996 Will ....................... G05G 9/047 74/471 XY
7,641,019 B2 * 1/2010 Pline ...................... B60K 26/02 180/315
9,809,155 B2 11/2017 Watz et al.
9,823,686 B1 11/2017 Clause
9,889,874 B1 2/2018 Clause
10,486,532 B2 11/2019 Chapman et al.
11,449,089 B1 9/2022 Seeger
12,147,261 B2 * 11/2024 Bechtel .................. B60K 26/02
12,409,879 B2 * 9/2025 Carlson ................. E02F 9/2004
12,410,585 B2 * 9/2025 Yoshida ................. B62D 12/00
12,546,090 B1 * 2/2026 Thompson ............ E02F 9/2012
2015/0060185 A1 3/2015 Feguri
2020/0299930 A1 9/2020 Wuisan et al.
2022/0305908 A1 9/2022 Jeong
2023/0373556 A1 11/2023 Heitmann et al.
2024/0367690 A1 * 11/2024 Cho ....................... B60K 26/02

* cited by examiner

*Primary Examiner* — Laura Freedman
(74) *Attorney, Agent, or Firm* — Shook, Hardy & Bacon L.L.P.

(57) ABSTRACT

A vehicle steering device is reconfigurable between a joystick mode to a steering wheel mode. The vehicle steering device includes a body, a rotary stand, and a grip. The body is configured to be oriented around a first pivot axis via a hinge at a first position corresponding to the joystick mode and a second position corresponding to the steering wheel mode. The rotary stand is coupled to the body via a shaft and pivotable around a second pivot axis.

17 Claims, 10 Drawing Sheets

L4
451
452
4522
453
455
47
466
454
462
446

RECONFIGURABLE STEERING DEVICE

TECHNICAL FIELD

The present disclosure relates generally to a steering device of a work vehicle.

BACKGROUND

A steering device for a work vehicle is designed to provide control and maneuverability. Some work vehicles, like combine harvesters and tractors, have steering wheels. A steering column, which connects the steering wheel to the steering mechanism, together with the steering wheel may block the visibility of the operator. The steering column and steering wheel may also interfere with the swivel of the operator seat, due to limited space in the cab.

SUMMARY

According to an aspect of the present disclosure, a vehicle steering device is reconfigurable between a joystick mode to a steering wheel mode. The vehicle steering device includes a body, a rotary stand, and a grip. The body is configured to be oriented around a first pivot axis via a hinge at a first position corresponding to the joystick mode and a second position corresponding to the steering wheel mode. The rotary stand is coupled to the body via a shaft and pivotable around a second pivot axis.

Other features and aspects will become apparent by consideration of the detailed description, claims, and accompanying drawings.

BRIEF DESCRIPTION OF THE DRAWINGS

The detailed description of the drawings refers to the accompanying FIGURES.

Like reference numerals are used to indicate like elements throughout the several FIGURES.

DETAILED DESCRIPTION

The present disclosure includes a vehicle steering device reconfigurable between a joystick mode and a steering wheel mode (mini steering wheel mode). The present disclosure allows an operator to select between the joystick mode and the steering wheel mode, depending on personal preference or specific operating condition. The vehicle steering device may be arranged on and pivotable about any object within an operator station of the work vehicle. FIGS. 1-3G illustrate the vehicle steering device coupled to an arm of the operator.

Figure 1:
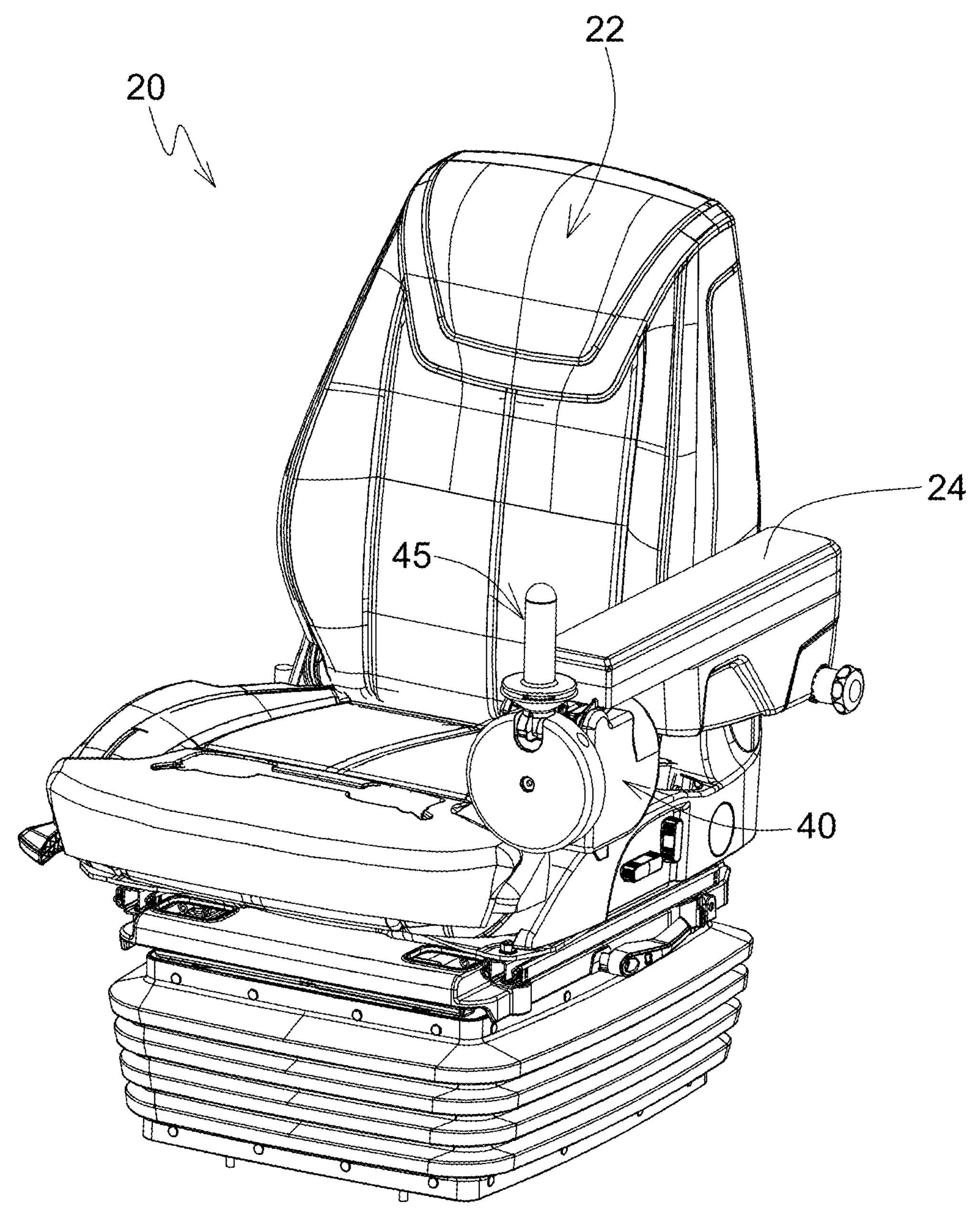
FIG. 1 is a perspective view of a seat with a reconfigurable steering device.

Referring to FIG. 1, a work vehicle 20, such as a tractor has an operator seat 22. The operator seat 22 includes arm 24, where a vehicle steering device 40 is pivotably coupled via a hinge 30. The hinge 30 may include hinge stand 32 disposed at the bottom of arm 24 (near distal end) and a knuckle 33 pivotably coupled to the hinge stand 32 with a hinge pin 34. The knuckle 33 may have a first hole 332 and a second hole 333. The vehicle steering device 40 is reconfigurable between the joystick mode and the steering wheel mode via the hinge 30. FIGS. 2A-2G illustrate various views of the vehicle steering device 40 disposed in the joystick mode; FIGS. 3A-3G illustrate various views of the vehicle steering device 40 disposed in the steering wheel mode.

Figure 5:
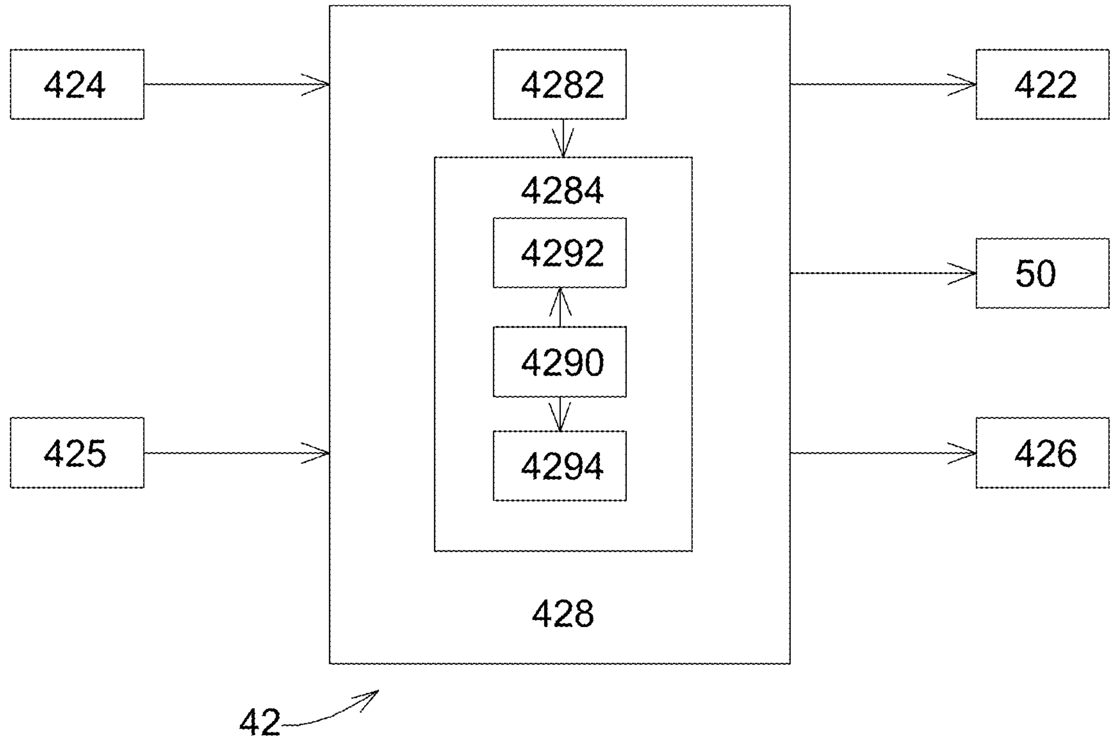
FIG. 5 is a block diagram of a control system operated by the reconfigurable steering device.

The vehicle steering device 40 includes a body 42, a locking mechanism 43, a rotary stand 44, and a grip 45. The body 42 is configured to be oriented around a first pivot axis L1 via the hinge 30 at a first position (shown in FIGS. 2A-2E) corresponding to the joystick mode and a second position (shown in FIGS. 3A-3E) corresponding to the steering wheel mode. The body 42 has a side cover 421 shown in FIGS. 2B, 3B but omitted in FIGS. 20, 2D, 3C, 3D for clarity. The body 42 may include an electric motor 422, a shaft 423 extended from the electric motor 422, an orientation sensor 424, an angle sensor 425, a brake 426, a bearing 427 surrounding the shaft 423, and a controller 428, as shown in FIG. 5. The details of elements of the body 42 and how they react in response to an operator's input to reorient the body 42 are described later.

Figure 2A:
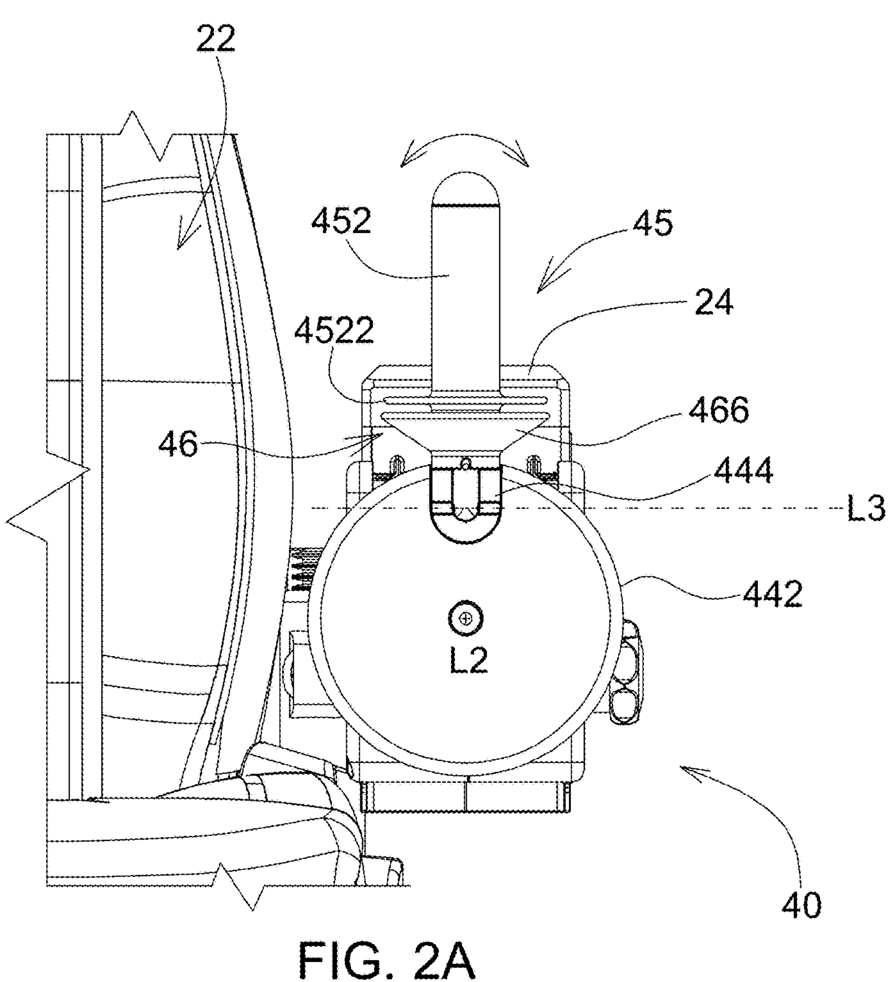
FIG. 2A is a front view of the reconfigurable steering device of FIG. 1 disposed in joystick mode.
Figure 2B:
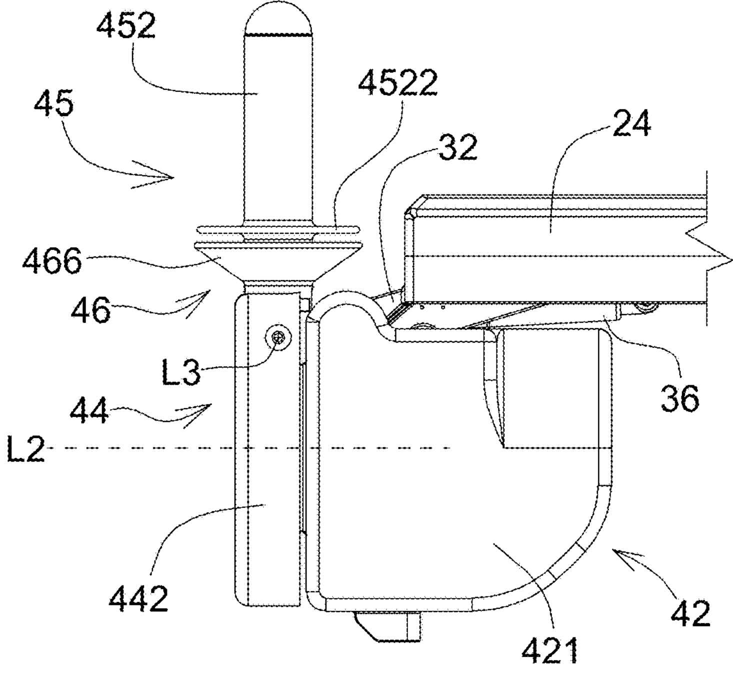
FIG. 2B is a side view of the reconfigurable steering device of FIG. 2A.
Figure 2C:
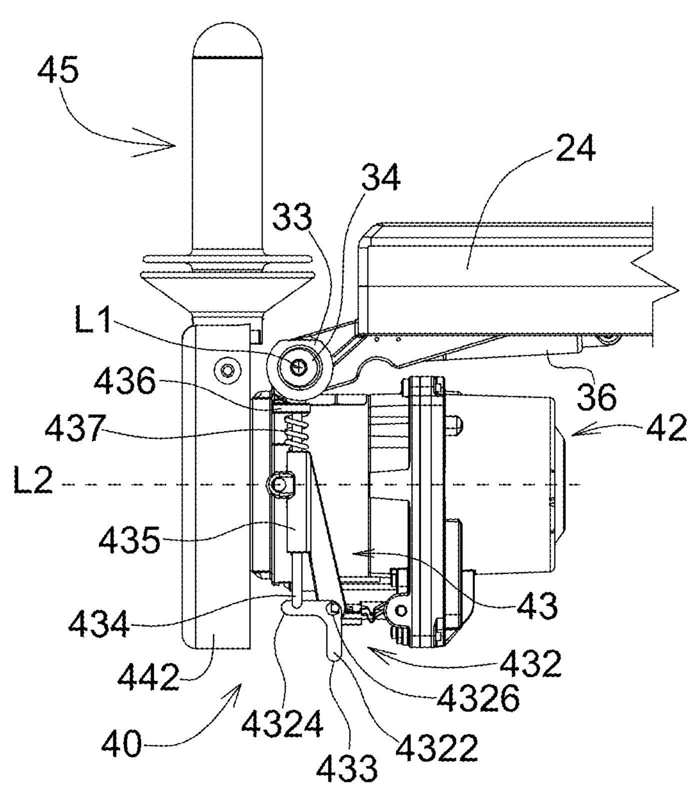
FIG. 2C is a side view of the reconfigurable steering device of FIG. 2A, with a side cover omitted.
Figure 2D:
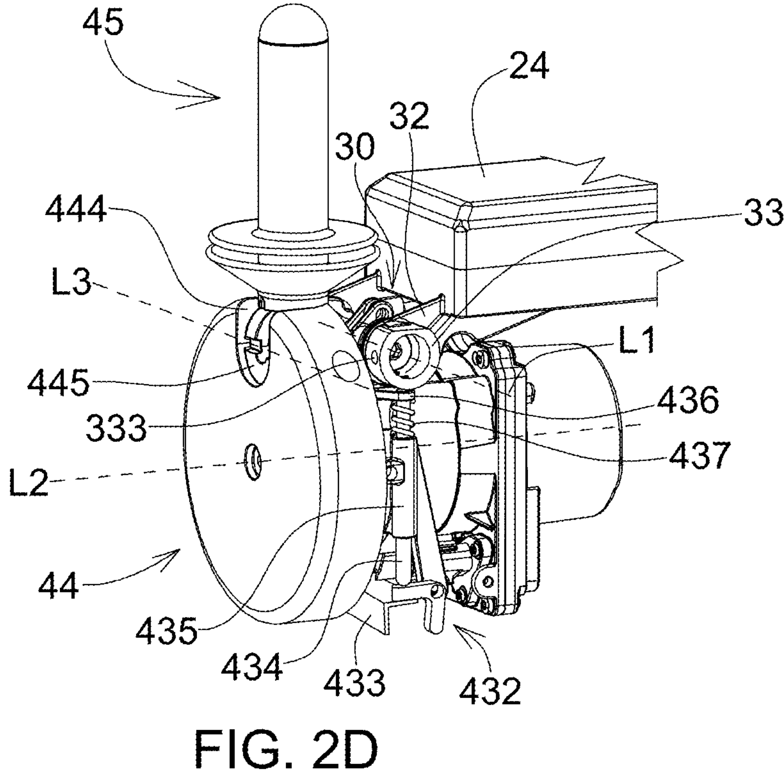
FIG. 2D is a perspective view of the reconfigurable steering device of FIG. 2A.
Figure 3A:
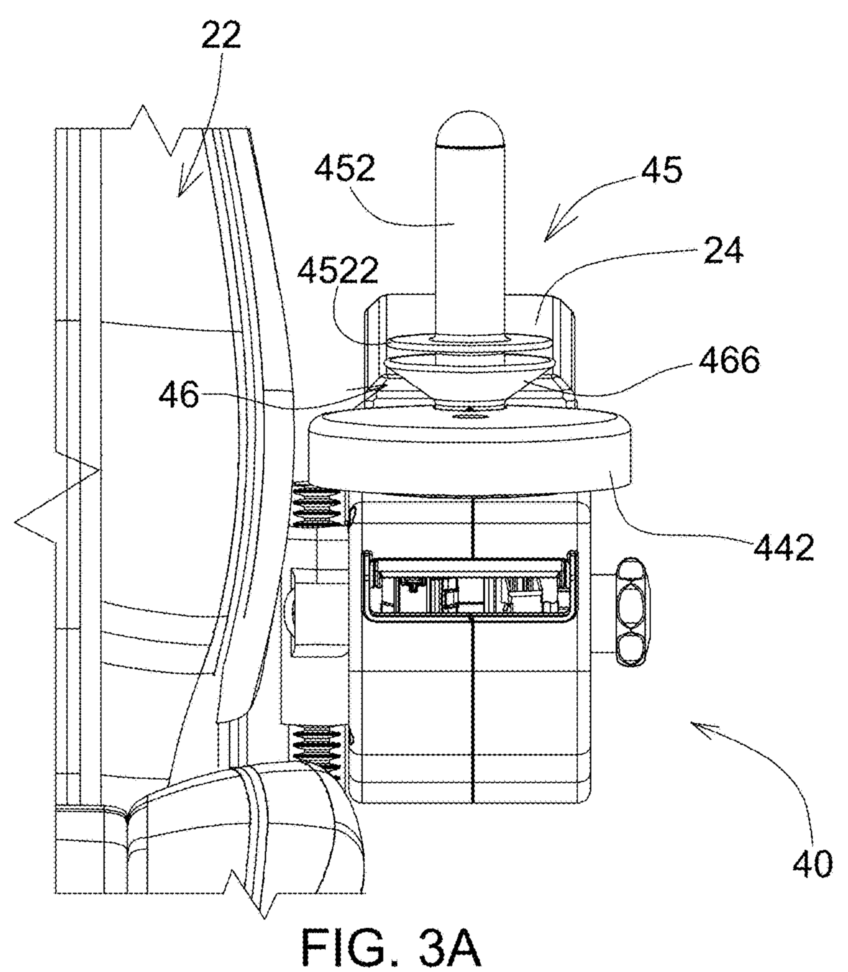
FIG. 3A is a front view of the reconfigurable steering device of FIG. 1 disposed in joystick mode.
Figure 3B:
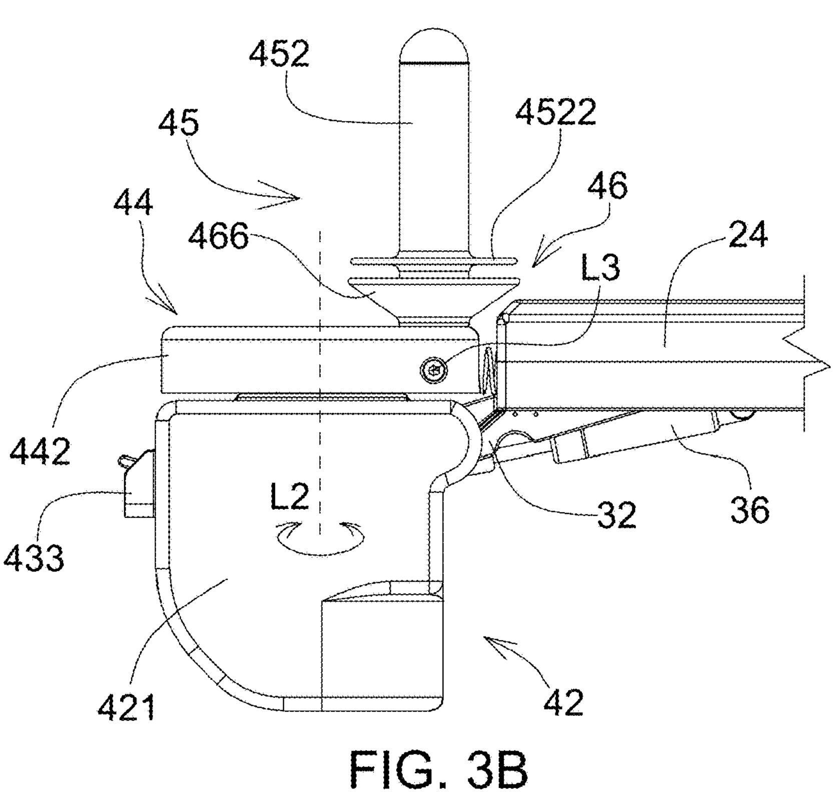
FIG. 3B is a side view of the reconfigurable steering device of FIG. 3A.
Figure 3C:
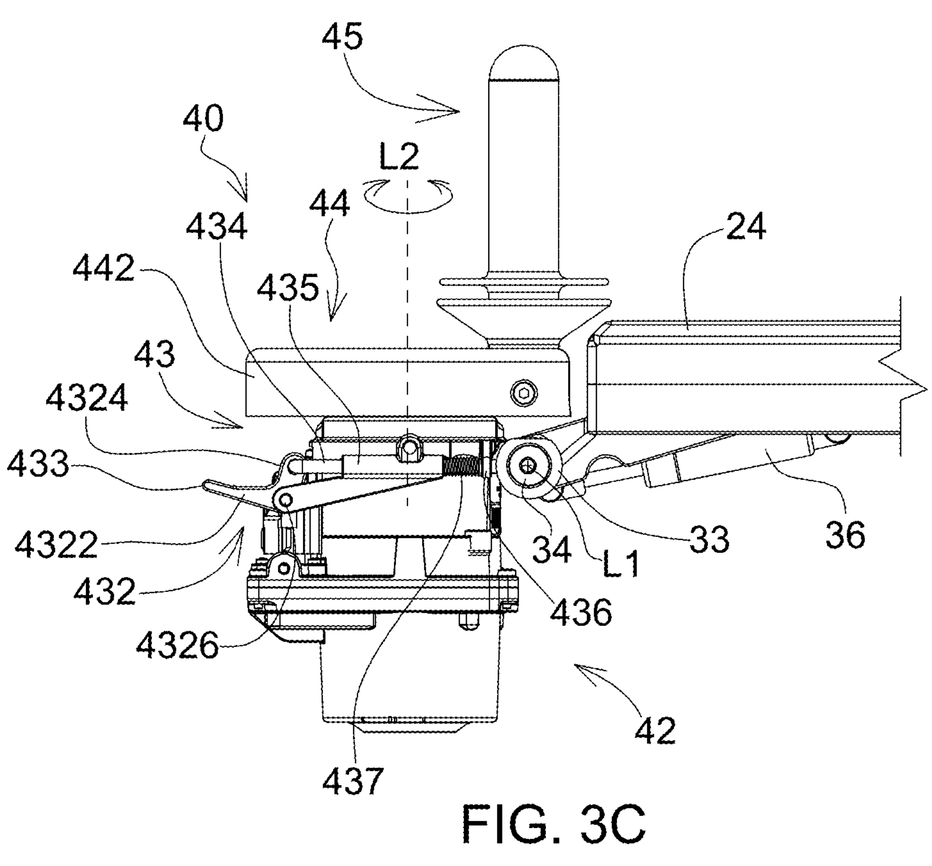
FIG. 3C is a side view of the reconfigurable steering device of FIG. 3A, with the side cover omitted.
Figure 3D:
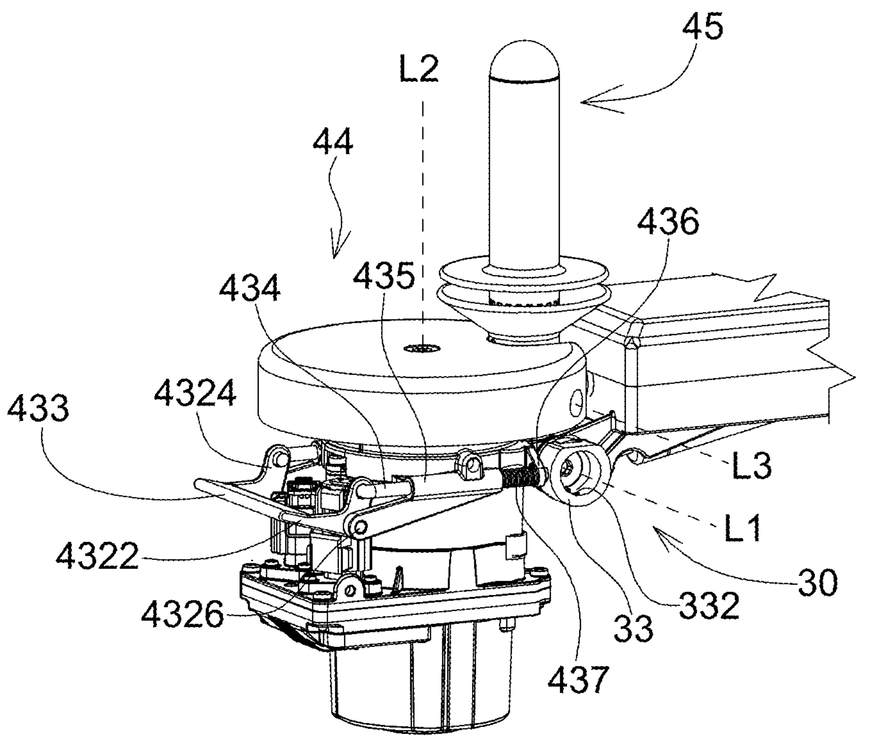
FIG. 3D is a perspective view of the reconfigurable steering device of FIG. 3A.

The locking mechanism 43 is coupled to the body 42 and configured to engage with the hinge 30 to selectively secure the body 42 at the first position and the second position. The locking mechanism 43 may include a bell crank 432, a handle 433, a locking pin 434, a barrel 435, a stop 436, and spring 437. The bell crank 432 may have a first lever 4322 and a second lever 4324 and is pivotably coupled to the body 42 at a pivot point 4326. The barrel 435 is mounted on a housing of the body 42 and the locking pin 434 is moveable and positioned through the barrel 435. The stop 436 is also mounted to the housing of the electric motor 422. The spring 437 is positioned between the end of the barrel 435 and the stop 436. A portion of the locking pin 434 near its tip is surrounded and engaged by the coil of the spring 437. The knuckle 33 may have the first hole 332 corresponding to the joystick mode and the second hole 333 corresponding to the steering wheel mode. One end (tip) of the locking pin 434 is connected to the second lever 4324 and another end of locking pin 434 is insertable into the first hole 332 of the hinge 30 for securing the first position of the body 42 and into a second hole 333 of the hinge 30 for securing the second position of the body 42. The spring force of the spring 437 may move the locking pin 434 toward the knuckle 33 (i.e. pivot the bell crank 432 in a second direction, which is clockwise in FIGS. 2C, 3C) to insert one of the first hole 332 or the second hole 333 to secure the vehicle steering device 40 at one of the joystick mode or the steering wheel mode. On the contrary, pressing the handle 433 may drag the locking pin 434 away from the knuckle 33 and the tip of the locking pin 434 is removed from the first hole 332 or the second hole 333 to release the locking pin 434 from the hinge 30 when the bell crank 432 is pivoted in the first direction. As shown in FIGS. 2C, 2D, 3C, 3D, the handle 433 is connected to the first lever 4322 of the bell crank 432 and is configured to pivot the bell crank 432 in the first direction, which is counterclockwise as shown in FIGS. 2C, 3C. With the locking mechanism 43 released, the vehicle steering device 40 is reconfigurable between the joystick mode and the steering wheel mode.

Figure 2E:
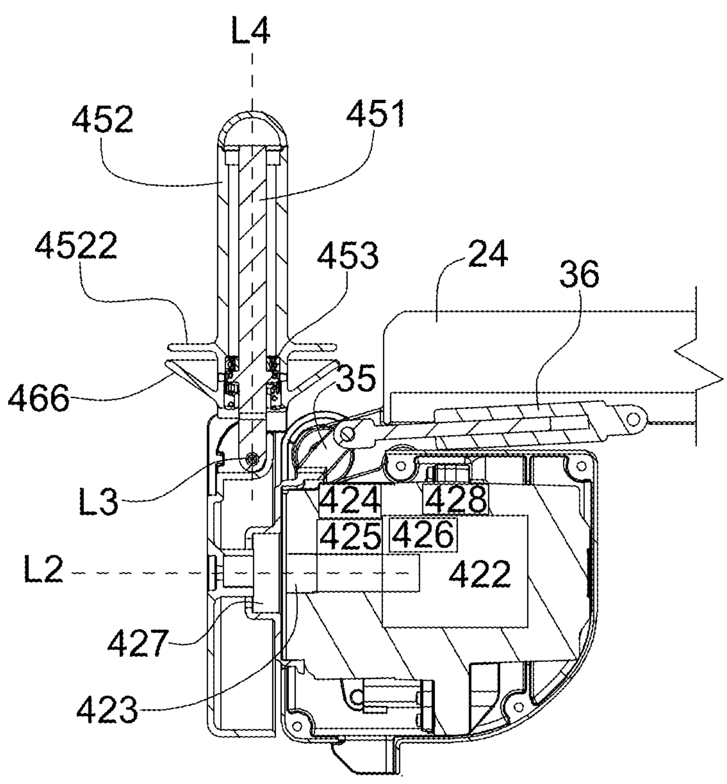
FIG. 2E is a cross-sectional view of the reconfigurable steering device of FIG. 2A.
Figure 2F:
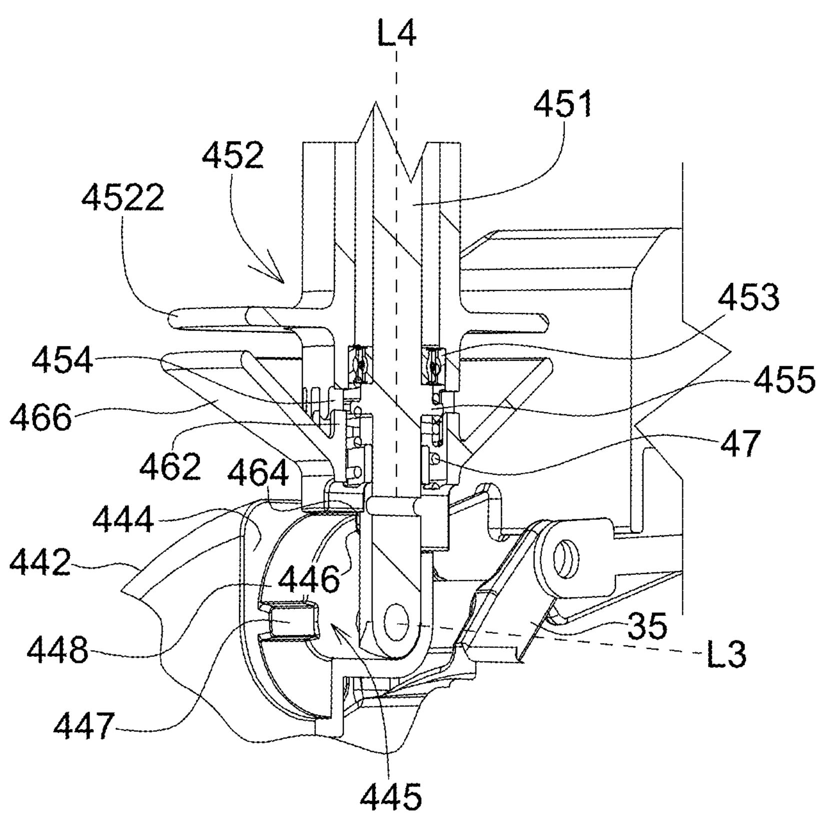
FIG. 2F is an enlarged cross-sectional view of a grip and a collar of the reconfigurable steering device of FIG. 2A, showing the collar located at a first notch of a guiding piece.
Figures 3E, 3F:
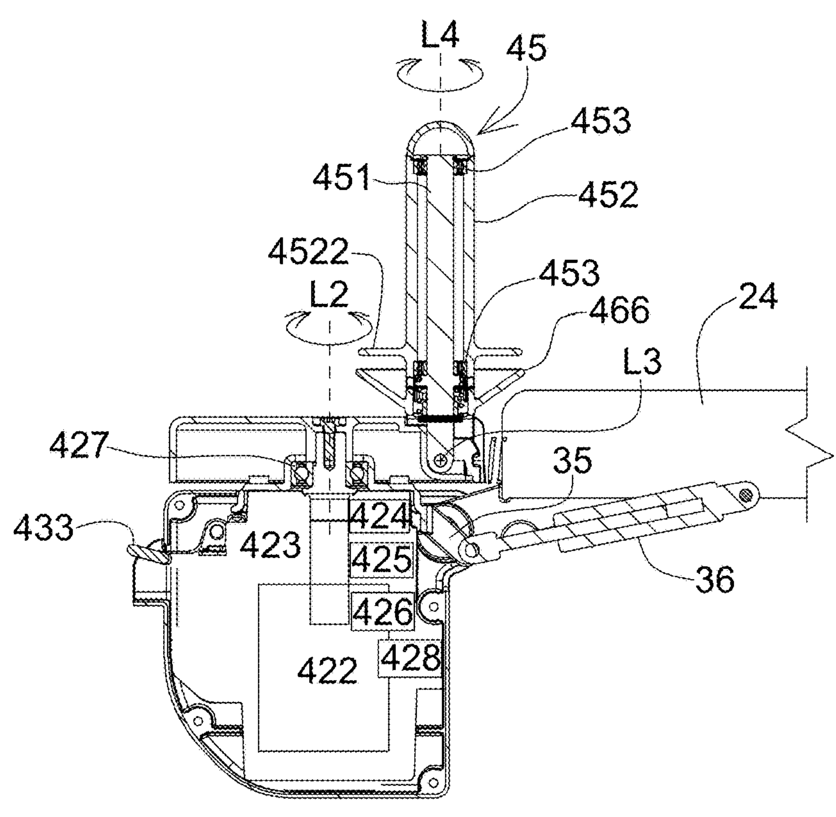
FIG. 3E is a cross-sectional view of the reconfigurable steering device of FIG. 3A.
FIG. 3F is an enlarged cross-sectional view of the grip and the collar of the reconfigurable steering device of FIG. 3A.

Optionally, referring to FIGS. 2E, 2F, 3E, the vehicle steering device 40 may include a linkage 35 coupled to the hinge 30 and is moveable when the hinge 30 pivots. A gas spring 36 is used to facilitate a reorientation between the first position and the second position of the body 42. One end of the gas spring 36 is connected to the linkage 35 and the other end of the gas spring 36 is connected to the arm 24 of the operator seat.

Referring to FIGS. 2A-2E, 3A-3E, the rotary stand 44 is coupled to the body 42 via the shaft 423 and pivotable around a second pivot axis L2. In one example, the rotary stand 44 is a circular disk, with the second pivot axis L2 passing through its center. The grip 45 is coupled to the rotary stand 44. An edge 442 of the rotary stand 44 forms a recess 444 to receive the bottom of the grip 45.

The grip 45 may be pivotably connected to the rotary stand 44 around a third pivot axis L3. The grip 45 defines a longitudinal axis L4 along its length. Referring to FIGS. 2A-2G, the grip 45 is pivotable to a first grip position relative to the rotary stand 44 when the body 42 is disposed at the first position. The longitudinal axis L4 may be perpendicular to the second pivot axis L2 in the first grip position. The joystick mode may allow the operator to hold the grip 45 and move the grip 45 side to side with a limited range. Referring to FIGS. 3A-3G, the grip 45 is pivotable to a second grip position relative to the rotary stand 44 when the body 42 is disposed in the second position. The longitudinal axis L4 may be parallel to the second pivot axis L2 in the second grip position. The steering wheel mode may allow the operator to hold the grip 45 and rotate the grip 45.

With reference to FIGS. 2E, 2F, 3E, 3F, the grip 45 may include a grip shaft 451 pivotable around the third pivot axis L3 and a grip housing 452 covering the grip shaft 451. The grip 45 may also include a bearing 453 disposed between the grip shaft 451 and the grip housing 452. The inner race of the bearing 453 remains stationary and the outer race of the bearing 453 rotates. The bearing 453 is configured to allow the grip housing 452 to rotate relative to the grip shaft 451 around the longitudinal axis L4.

The vehicle steering device 40 may include a collar 46 interconnecting the grip and the rotary stand 44. The collar 46 is positioned between the grip housing 452 and the rotary stand 44 in the direction of the longitudinal axis L4 and slidable along the grip shaft 451. The collar 46 is operable to secure the grip 45 at one of the first grip position and the second grip position after the grip 45 pivoting around the third pivot axis L3. In addition, the collar 46 may lock or unlock a rotation of the grip housing 452 relative to the grip shaft 451 around the longitudinal axis L4.

The rotary stand 44 may include a guiding piece 445 at the recess 444 and having a first collar location and a second collar location. The first collar location and the second collar location define a curved path 448 for the collar 46 to move between the first collar location and the second collar location and to pivot around the third pivot axis L3. To secure grip 45 at one of the first grip position and the second grip position, the guiding piece 445 includes a first notch 446 at a first collar location and a second notch 447 at a second collar location, and the collar 46 may include a protrusion 464 extending downward from its bottom. In the joystick mode, the grip 45 is disposed at the first grip position when the collar 46 is at the first collar location. The first notch 446 receives the protrusion 464 of the collar 46 when the grip 45 is disposed at the first grip position. In the steering wheel mode, the grip 45 is disposed at the second grip position when the collar 46 is at the second collar location. The second notch 447 receives the protrusion 464 of the collar 46 when the grip 45 is disposed the second grip position.

A spring 47 is positioned between the grip housing 452 and the collar 46 in the direction of the longitudinal axis L4. The grip shaft 451 may extend radially to form a shoulder 455. One end of the spring 47 may engage the bottom of the shoulder 455 and the other end of the spring 47 may engage the top of the collar 46. The spring force from the spring 47 pushes the collar 46 downward to facilitate the protrusion 464 of the collar 46 positioned or received at one of the first notch 446 and the second notch 447, when grip 45 is pivoted to one of the first grip position or second grip position. The grip housing 452 may extend radially relative to the longitudinal axis L4 to form a platform 4522. The collar 46 extends upward and radially relative to the longitudinal axis to form a frusto-conical portion 466 with an opening facing the platform 4522. The operator's palm near the index and middle fingers can rest on the top of the platform 4522. When the operator wants to change the position of the grip 45, the operator may use his or her fingers to move the frusto-conical portion 466 to lift the collar 46, biasing or compressing the spring 47. Therefore, the protrusion 464 can be removed from the first notch 446 or the second notch 447, which facilitate smooth travel of the grip 45 between the first grip position and the second grip position.

Figure 2G:
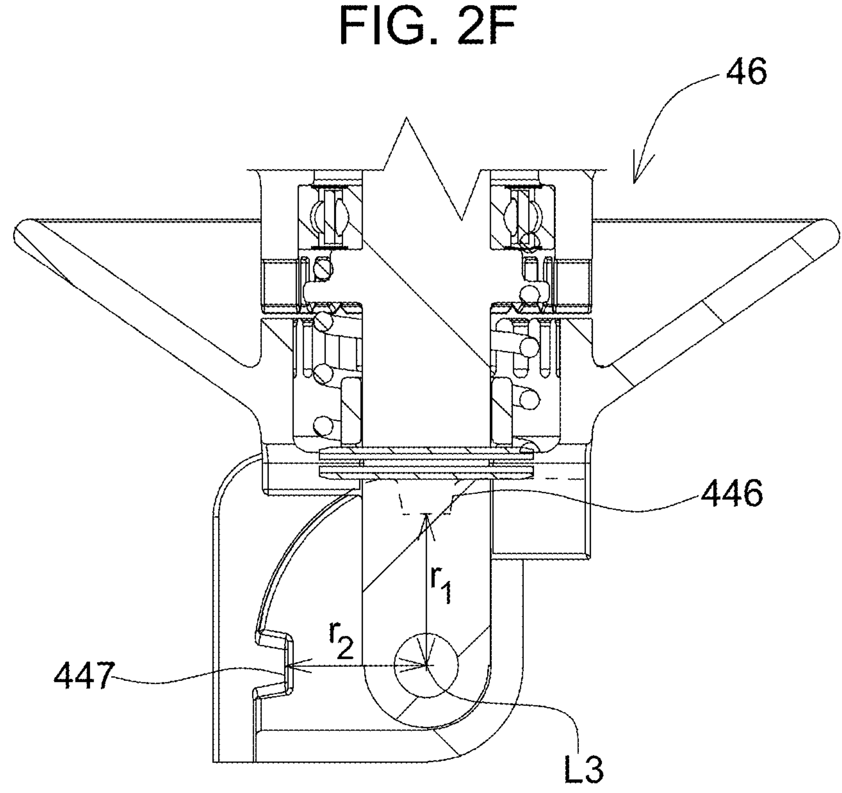
FIG. 2G is an enlarged side view of the collar of FIG. 2F, showing the collar located at the first notch of the guiding piece.
Figure 3G:
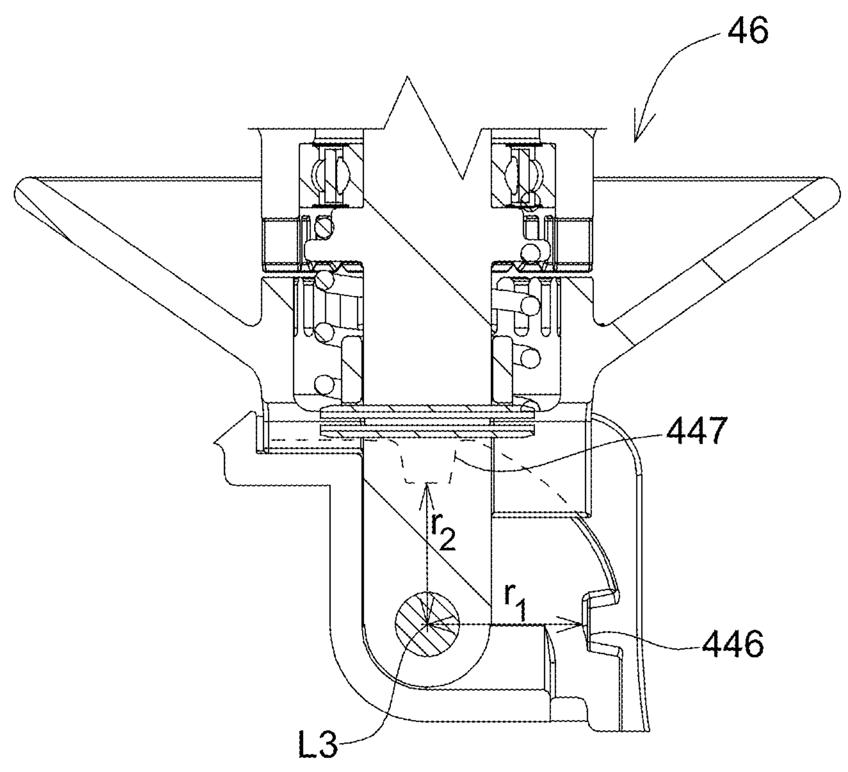
FIG. 3G is an enlarged side view of the collar of FIG. 3F, showing the collar located at the second notch of the guiding piece.
Figure 4:
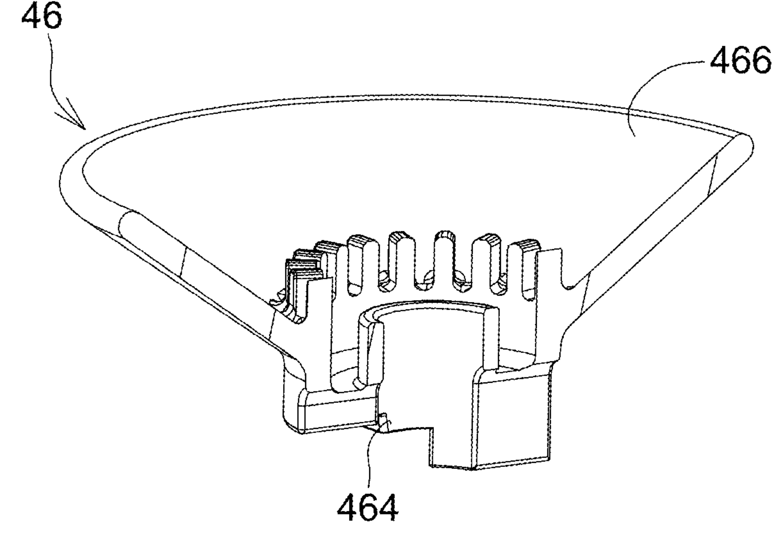
FIG. 4 is a cross-sectional view of the collar of the reconfigurable steering device.

The structure of the grip 45, the collar 46, and the spring 47 may lock or unlock a rotation of the grip housing 452 relative to the grip shaft 451 around the longitudinal axis L4 as needed. When the vehicle steering device 40 is disposed at the joystick mode, the collar 46 locks the rotation of the grip housing 452; when the vehicle steering device 40 is disposed at the steering wheel mode, the collar 46 allows the rotation of the grip housing 452. In one example, the bottom of the grip housing 452 may have teeth 454, and the top of the collar 46 may have teeth 462 facing the teeth 454 of the grip housing 452. The teeth 462 of the collar 46 is configured to interlock the teeth 454 of the grip housing 452. The guiding piece 445 herein is eccentric. As shown in FIGS. 2G, 3G, a radial distance r1 between the bottom of the first notch 446 relative to the third pivot axis L3 is longer than a radial distance r2 between the bottom of the second notch 447 relative to the third pivot axis L3. When the vehicle steering device 40 is disposed at the joystick mode, the longer radial distance of the first notch 446 pushes or abuts the protrusion 464 of the collar 46, the spring 47 is compressed, and the teeth 462 of the collar 46 therefore engage teeth 454 of the grip housing 452, which prevents the rotation of the grip housing 452 relative to the grip shaft 451 around the longitudinal axis L4. When the vehicle steering device 40 is disposed at the steering wheel mode, the second notch 447, which has shorter radial distance than does the first notch 446, compresses the spring 47 less than the first notch 446, and the spring force separates the teeth 454 and the teeth 462. The collar 46 disengages from the grip housing 452.

Referring to FIGS. 2E, 3E, 5, the electric motor 422 is included in the body 42 and having the (output) shaft 423 configured to rotate the rotary stand 44. The orientation sensor 424 is configured to detect an orientation of the body 42 around the first pivotal axis L1 and generate an orientation signal indicative thereof. The angle sensor 425 is configured to detect the angle of the rotary stand 44 relative to the body 42 around the second pivotal axis L2 and generate an angle signal indicative thereof. The controller 428 is disposed in communication with the orientation sensor 424, the angle sensor 425, the electric motor 422, and the brake 426. The controller 428 is operable to receive orientation signals from the orientation sensor 424, receive angle signals from the angle sensor 425, communicate a signal to the electric motor 422, and communicate a signal to the brake 426. While the controller 428 is generally described herein as a singular device, it should be appreciated that the controller 428 may include multiple devices linked together to share and/or communicate information therebetween. Furthermore, it should be appreciated that the controller 428 may be located on the vehicle steering device 40 or located remotely from the vehicle steering device 40.

The controller 428 may alternatively be referred to as a computing device, a computer, a control unit, a control module, a module, etc. The controller 428 includes a processor 4282, a memory 4284, and all software, hardware, algorithms, connections, sensors, etc., necessary to manage and control the operation of the orientation sensor 424, the angle sensor 425, the electric motor 422, and the brake 426. As such, a method may be embodied as a program or algorithm operable on the controller 428. It should be appreciated that the controller 428 may include any device capable of analyzing data from various sensors, comparing data, making decisions, and executing the required tasks.

As used herein, "controller 428" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 428 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 428 may be in communication with other components on the vehicle steering device 40, such as hydraulic components, electrical components, and operator inputs within an operator station of an associated work vehicle. The controller 428 may be electrically connected to these other components by a wiring harness such that messages, commands, and electrical power may be transmitted between the controller 428 and the other components. Although the controller 428 is referenced in the singular, in alternative embodiments the configuration and functionality described herein can be split across multiple devices using techniques known to a person of ordinary skill in the art.

The controller 428 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 4284 may include any non-transitory/tangible medium which participates in providing data or computer-readable instructions. The memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 428 includes the tangible, non-transitory memory on which are recorded computer-executable instructions, including a mode determine algorithm 4290, a joystick algorithm 4292, and a steering wheel algorithm 4294. The processor 4282 of the controller 428 is configured for executing the mode determine algorithm 4290, the joystick algorithm 4292, and the steering wheel algorithm 4294. The mode determines algorithm 4290 implements a method of determining which of the joystick algorithm 4292 and the steering wheel algorithm 4294 is executed, the joystick algorithm 4292 implements a method of operating the vehicle steering device 40 under the joystick mode, and the steering wheel algorithm 4294 implements a method of operating the vehicle steering device 40 under the steering wheel mode described in detail below.

To determine which mode of the vehicle steering device 40 that is currently disposed, the processor 4282 may execute the mode determine algorithm 4290 to receive the orientation signal from the orientation sensor 424. The processor 4282 then determines which of the joystick algorithm 4292 or the steering wheel algorithm 4294 is executed afterward based on the orientation signal. The orientation sensor 424, for example, is a hinge angle sensor located on the hinge. In another example, the orientation sensor 424 is a gyroscope, an accelerometer, a magnetometer, or other type of sensor that transmits data for the processor 4282 to determine the orientation of the vehicle steering device 40.

If the processor 4282 determines that the vehicle steering device 40 is currently disposed in the joystick mode, the processor 4282 executes the joystick algorithm 4292 to receive a first angle signal from the angle sensor 425, determine whether the rotary stand 44 is positioned at a home position (shown in FIG. 2A) based on the first angle signal. The angle of the rotary stand 44 relative to the body 42, pivotal around the second pivot axis L2, is defined by an offset between a reference location of the rotary stand 44 that is currently at and the home position. In another word, the angle of the rotary stand 44 relative to the body 42 can be the angle between the grip 45 pivoted with the rotary stand 44 around the second pivot axis L2 and the grip 45, moved with the rotary stand 44 at its home position. It is likely that the vehicle steering device 40 is currently disposed in the joystick mode but the rotary stand 44 is not positioned at the home position, and therefore self-centering function may be performed. In one example, when the vehicle steering device 40 is just reoriented to the joystick mode from the steering wheel mode, the reference location of the rotary stand 44 can be any possible position at the moment the steering wheel mode ends. The grip 45, at the first grip position, may not be positioned upright due to the offset. The processor 4282 then executes the joystick algorithm 4292 to output a motor command signal to the electric motor 422 to rotate the rotary stand 44 to the home position if the rotary stand 44 is determined not at the home position. After the self-centering function is performed, the vehicle steering device 40 in joystick mode is ready for the operator to operate. The operator moves the grip 45 and processor 4282 executes the joystick algorithm 4292 to output a steering control signal to an actuator to turn a ground engaging device 50, such as front wheels, based on the angle signal indicative of the angle of the rotary stand 44 relative to the body 42.

The brake 426, as discussed, is configured to resist rotation of the rotary stand 44. The operator, when moving the grip 45 side to side, may feel resistance accordingly. The processor 4282 is operable to execute the joystick algorithm 4292 to receive a second angle signal from the angle sensor 425 and to output a brake command signal to the brake 426 to provide resistance against the rotary stand 44, and the resistance is determined based on the angle of the rotary stand 44 relative to the body 42. The greater the angle of the rotary stand 44 relative to the body 42, the greater the resistance may be generated, which the operator can experience the increasing resistance while the operator pivots the grip 45 in one direction. It is noted that in joystick mode, the angle of the rotary stand 44 relative to the body 42 may have a maximum value, e.g., forty-five degrees, in either direction. The processor 4282 executes the joystick algorithm 4292 to increase the resistance, by the brake command signal, to limit a range of the rotation of the rotary stand 44 when the angle, indicated by the second signal, reaches the threshold. The angle of the rotary stand 44 maximum value may be increased or decreased depending on a number of factors such as vehicle speed, vehicle configuration, vehicle operation mode, etc.

If the processor 4282 determines that the vehicle steering device 40 is currently disposed in the steering wheel mode, the processor 4282 executes the steering wheel algorithm 4294 to output another steering control signal to the actuator to turn the ground engaging device 50, based on the angle signal indicative of the angle of the rotary stand 44 relative to the body 42. The processor 4282 is also operable to execute the steering wheel algorithm 4294 to output a brake command signal to define a range of rotation of the rotary stand 44. The range of rotation of the rotary stand 44 relative to the body 42 in the steering wheel mode may be different from the range of rotation of the rotary stand 44 relative to the body 42. Therefore, processor 4282 outputs the brake command signal to the brake 426 to change the range of rotation of the rotary stand after the body 42 is orientated from the first position to the second position or from the second position to the first position. In one example, the range of rotation of the rotary stand 44 relative to the body 42 in the steering wheel mode may exceed forty-five degrees, such as three hundred and sixty degrees. In another example, the range of rotation of the rotary stand 44 relative to the body 42 in the steering wheel mode may be infinite.

It is noted that, for the operator's user experience, the processor 4282 is operable to execute the steering wheel algorithm 4294 to output a brake command signal to provide a constant resistance against rotation of the rotary stand 44.

Optionally, a sensitivity tuner may be disposed on the vehicle steering device 40. The sensitivity tuner is coupled to the controller 428 and is operable to adjust a relationship between a change in the angle of the rotary stand 44 relative to the body 42 and the ground engaging device 50 (e.g., wheels). Alternatively, the joystick algorithm 4292 and/or the steering wheel algorithm 4294 may have subroutine or helper function to respectively define the sensitivity in the joystick mode and/or steering wheel mode.

Without in any way limiting the scope, interpretation, or application of the claims appearing below, a technical effect of one or more of the example embodiments disclosed herein is to provide a steering device can be oriented in two distinct orientations with the pivot axis oriented horizontally (joystick operation) or vertically (steering wheel operation). The device is equipped with a combination electric motor/sensor which can via software limit the travel infinitely between 0 and 360 degrees, adjust the amount of resistance to change the resistance provided to the operator, and can provide a self-centering function. In addition, the device is equipped with a grip that can be rotated relative to steering motor axis to remain vertically oriented regardless of the horizontal or vertical orientation of the steering motor (or the body).

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally," "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A vehicle steering device, comprising:

a body configured to be oriented around a first pivot axis via a hinge at a first position corresponding to a joystick mode and a second position corresponding to a steering wheel mode;

a rotary stand coupled to the body via a shaft and pivotable around a second pivot axis; and a grip pivotably coupled to the rotary stand around a third pivot axis, the grip pivotable to a first grip position relative to the rotary stand when the body is disposed at the first position and pivotable to a second grip position relative to the rotary stand when the body is disposed in the second position, and the grip defining a longitudinal axis perpendicular to the second pivot axis in the first grip position and parallel to the second pivot axis in the second grip position.

2. The vehicle steering device of claim 1, wherein an edge of the rotary stand forms a recess to receive a bottom of the grip.

3. The vehicle steering device of claim 1, wherein the grip defines the longitudinal axis and includes a grip shaft pivotable around the third pivot axis, a grip housing covering the grip shaft, and a bearing disposed between the grip shaft and the grip housing and configured to allow the grip housing to rotate relative to the grip shaft around the longitudinal axis.

4. The vehicle steering device of claim 3, further comprising a collar positioned between the grip housing and the rotary stand in a direction of the longitudinal axis and slidable along the grip shaft to lock or unlock a rotation of the grip housing relative to the grip shaft around the longitudinal axis.

5. The vehicle steering device of claim 4, further comprising a spring positioned between the grip housing and the collar in the direction of the longitudinal axis.

6. The vehicle steering device of claim 5, wherein the rotary stand includes a guiding piece having a first collar location and a second collar location, which define a curved path for the collar to move between the first collar location and the second collar location and to pivot around the third pivot axis, wherein the grip is disposed at the first grip position when the collar is at the first collar location and is disposed at the second grip position when the collar is at the second collar location.

7. The vehicle steering device of claim 6, wherein the guiding piece is eccentric and includes a first notch at the first collar location configured to receive a protrusion of the collar and a second notch at the second collar location configured to receive the protrusion of the collar, a radial distance between a bottom of the first notch relative to the third pivot axis is longer than a radial distance between a bottom of the second notch relative to the third pivot axis.

8. The vehicle steering device of claim 7, wherein when the first notch receives the protrusion of the collar, the collar engages with the grip housing with the spring compressed, and when the second notch receives the protrusion of the collar, the collar disengages from the grip housing by a spring force from the spring.

9. The vehicle steering device of claim 4, wherein a bottom of the grip housing has teeth, and a top of the collar has teeth facing the teeth of the grip housing and configured to interlock the teeth of the grip housing.

10. The vehicle steering device of claim 4, wherein the grip housing extends radially relative to the longitudinal axis to form a platform, and the collar extends upward and radially relative to the longitudinal axis to form a frustoconical portion with an opening facing the platform.

11. The vehicle steering device of claim 1, further comprising a locking mechanism coupled to the body and configured to engage with the hinge to selectively secure the body at the first position and the second position.

12. The vehicle steering device of claim 11, wherein the locking mechanism includes:

a bell crank having a first lever and a second lever and pivotably coupled to the body;

a handle connected to the first lever and configured to pivot the bell crank in a first direction; and a locking pin, one end of which connected to the second lever and another end of which is insertable into a first hole of the hinge for securing the first position of the body and into a second hole of the hinge for securing the second position of the body, is released from the hinge when the bell crank is pivoted in the first direction.

13. The vehicle steering device of claim 1, further comprising a linkage coupled to the hinge and a gas spring, one end of the gas spring is connected to the linkage to facilitate a reorientation between the first position and the second position of the body.

14. The vehicle steering device of claim 13, wherein another end of the gas spring is connected to an arm of an operator seat disposed at a vehicle.

15. The vehicle steering device of claim 1, further comprising a collar interconnecting the grip and the rotary stand and operable to secure the grip at one of the first grip position and the second grip position;

wherein the rotary stand includes a guiding piece having a first collar location and a second collar location, which define a curved path for the collar to move between the first collar location and the second collar location and to pivot around the third pivot axis.

16. The vehicle steering device of claim 15, wherein the collar includes a protrusion, the guiding piece includes a first notch at the first collar location and a second notch at the second collar location, the grip is disposed at the first grip position when the first notch receives the protrusion and is disposed at the second grip position when second notch receives the protrusion.

17. The vehicle steering device of claim 1, further comprising a motor operatively connected to the rotary stand and configured to rotate the rotary stand about the second pivot axis.

* * * * *